(12) United States Patent
Ferik et al.

(10) Patent No.: US 8,803,956 B2
(45) Date of Patent: Aug. 12, 2014

(54) COMPUTER VISION-BASED VALVE CONTROL SYSTEM AND METHOD

(75) Inventors: Sami El Ferik, Dhahran (SA); Mustafa El-Shafei, Dhahran (SA); Mohammad Shaqura, Dammam (SA); Atef Bouchrit, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 337 days.

(21) Appl. No.: 13/332,001

(22) Filed: Dec. 20, 2011

(65) Prior Publication Data

US 2013/0155227 A1  Jun. 20, 2013

(51) Int. Cl.
*H04N 7/18* (2006.01)
*H04N 5/232* (2006.01)
*G08G 1/017* (2006.01)
*G08G 1/054* (2006.01)
*B64F 1/18* (2006.01)
*G08G 5/00* (2006.01)

(52) U.S. Cl.
USPC ......... 348/61; 348/69; 348/211.4; 348/211.8; 340/937; 340/945

(58) Field of Classification Search
CPC ............ B62D 6/04; B62D 7/22; B63H 20/12; C25B 1/04; C25B 9/00

USPC ........ 348/61, 69, 211.4, 211.8; 340/937, 945; 364/265, 268, 270, 271, 276, 332

See application file for complete search history.

(56) References Cited

U.S. PATENT DOCUMENTS

| | | | |
|---|---|---|---|
| 4,743,170 A | 5/1988 | Marshall | |
| 5,056,046 A * | 10/1991 | Mutchler et al. | 702/98 |
| 5,231,469 A | 7/1993 | Jeffers et al. | |
| 5,257,921 A | 11/1993 | Clarke et al. | |
| 5,684,596 A | 11/1997 | Eslinger et al. | |
| 5,691,813 A | 11/1997 | Wood | |
| 6,267,349 B1 | 7/2001 | Gomes et al. | |
| 6,453,261 B2 * | 9/2002 | Boger et al. | 702/138 |
| 6,776,389 B2 | 8/2004 | Ito | |
| 7,454,841 B2 | 11/2008 | Burns, Jr. et al. | |
| 7,545,288 B2 * | 6/2009 | Schiek et al. | 340/945 |

\* cited by examiner

*Primary Examiner* — Daquan Zhao
(74) *Attorney, Agent, or Firm* — Richard C Litman

(57) ABSTRACT

The computer vision-based valve control system and method includes a camera mounted on a pneumatic control valve in such a way that the camera periodically observes positioning of the valve stem. An image processor is applied to the output of the camera to determine percentage opening of the valve. The valve opening percentage of the image processor is fed to a PID controller that uses the valve opening percentage in its process control calculations.

10 Claims, 6 Drawing Sheets

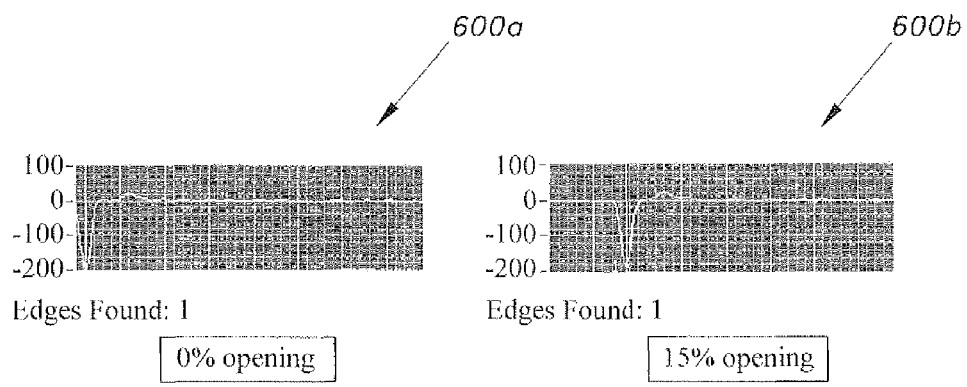
Fig. 6A   Fig. 6B
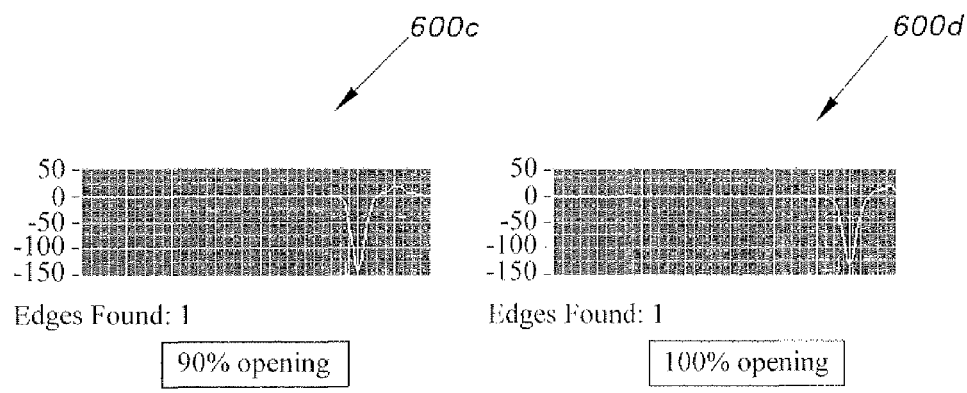
Fig. 6C   Fig. 6D

COMPUTER VISION-BASED VALVE CONTROL SYSTEM AND METHOD

BACKGROUND OF THE INVENTION

1. Field of the Invention

The present invention relates to control systems, and particularly to a computer vision-based valve control system and method.

2. Description of the Related Art

Control valves problems offer one of the most challenging problems in process control. Better control of valve response allows better control of production quality and low operation cost. In many cases, feedback of the valve opening is detected using measurement of the process variable (for example, flow rate). Present technologies allow industry to get direct feedback of the valve opening through measuring the actual valve stem position using mechanical or magnetic means. However, it would be desirable to eliminate such reliance on mechanical or magnetic valve stem position measuring techniques.

Thus, a computer vision-based valve control system and method solving the aforementioned problems is desired.

SUMMARY OF THE INVENTION

The computer vision-based valve control system and method features a camera mounted on a pneumatic control valve in such a way that the camera periodically observes positioning of the valve stem. An image processor is applied to the output of the camera to determine valve opening percentage. Output of the image processor is fed to a PID (proportional-integral-derivative) controller that uses the visually determined valve opening percentage in its process control calculations.

These and other features of the present invention will become readily apparent upon further review of the following specification and drawings.

BRIEF DESCRIPTION OF THE DRAWINGS

FIG. 6A is an edge strength profile plot at 0% opening in a computer vision-based valve control system according to the present invention.

FIG. 6B is an edge strength profile plot at 15% opening in a computer vision-based valve control system according to the present invention.

FIG. 6C is an edge strength profile plot at 90% opening in a computer vision-based valve control system according to the present invention.

FIG. 6D is an edge strength profile plot at 100% opening in a computer vision-based valve control system according to the present invention.

Similar reference characters denote corresponding features consistently throughout the attached drawings.

DETAILED DESCRIPTION OF THE PREFERRED EMBODIMENTS

Figure 4:
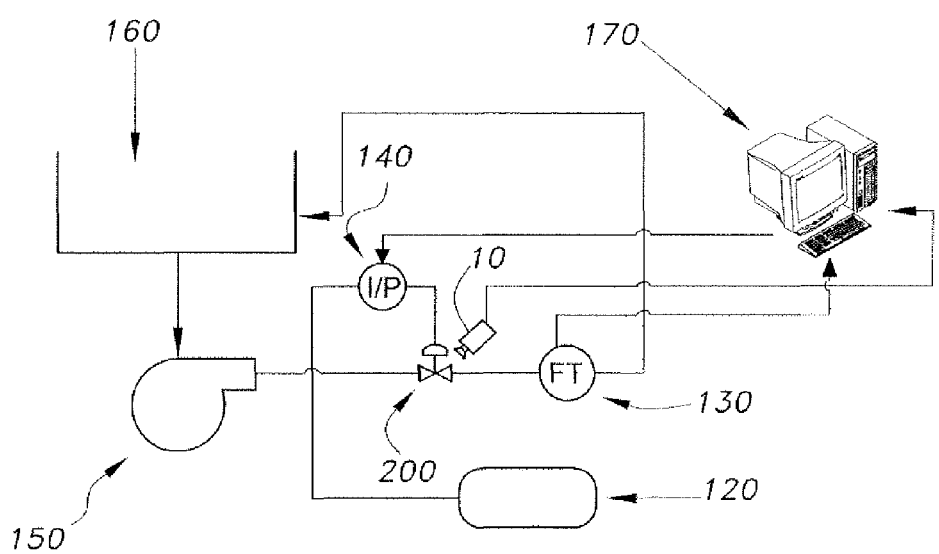
FIG. 4 is a schematic diagram of a computer vision-based valve control system according to the present invention, showing components thereof.

The computer vision-based valve control system 400, shown in FIG. 4, features a camera 10 mounted on a pneumatic control valve 200 in such a way that the camera 10 is able to periodically observe positioning of the valve stem. An image processor 170 accepts output from the camera 10 and determines valve opening percentage based on the camera-observed valve position. Output of image processor 170 is fed to a PID controller incorporated into the image processor 170 that uses the visually determined valve opening percentage in its process control calculations. PID control signals from the image processor 170 are then fed to a current-to-pressure (I/P) converter 140 for position control of a diaphragm-type valve actuator 60 (shown in FIG. 2A) on the valve 200.

Figure 1A:
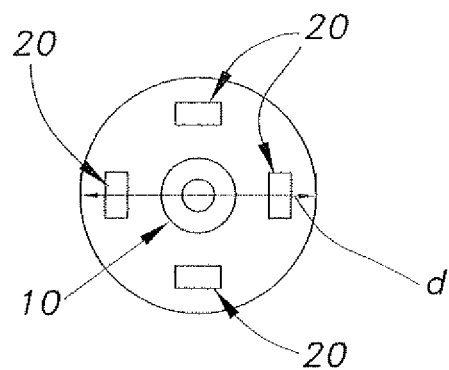
FIG. 1A is a schematic front view of a camera of a computer vision-based valve control system according to the present invention.
Figure 1B:
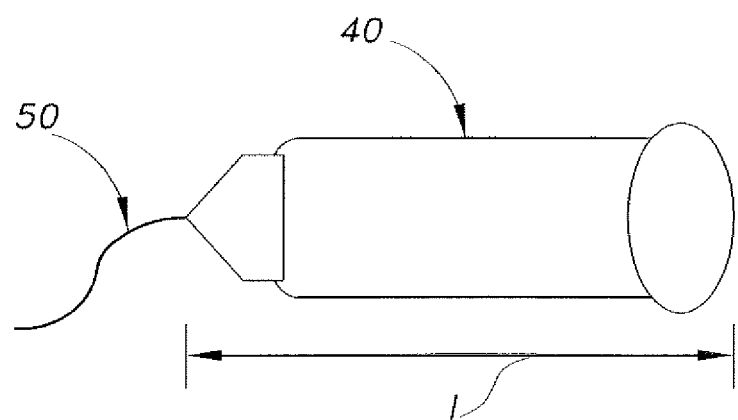
FIG. 1B is a schematic side view of the camera of FIG. 1.

As shown in FIGS. 1A and 1B, the camera 10 has a VGA CMOS sensor providing a resolution of approximately 300,000 pixels. The image captured is 640×480 pixels. The camera body has four light emitting diodes (LEDs) 20, which supply constant illumination to the valve stem target for ease of image processing. The lens of the camera 10 and the LEDs 20 are mounted on a single electronic circular board having a diameter of approximately 14 mm. The camera body 40 is preferably waterproof and dustproof. The camera 10 is powered by and connected to the processor 170 using a USB cable 50.

The camera 10 can be mounted in any position that allows it to detect valve stem movements. In the exemplary valve shown, the camera 10 is mounted on the valve so that the camera can be aimed at the metallic part 70, which depends from the valve stem attached to the diaphragm and moves with it simultaneously. The lower portion of the diaphragm-type valve actuator 60 is covered by a plastic cap 100 to isolate the valve stem and the metallic part 70 from variations of light intensity in the environment. A hole 110, preferably of 15 mm diameter, is formed through the plastic cap 100 so that the camera 10 can be inserted through the hole 110 and aimed at the metallic part 70 that depends from the diaphragm and moves with the valve stem. The camera LEDs 20 provide the sole, constant source of light for camera observation of valve stem positioning. This technique eliminates the biggest image processing disturbance and reduces image noise created by light reflection at some positions of the valve stem.

Figure 2A:
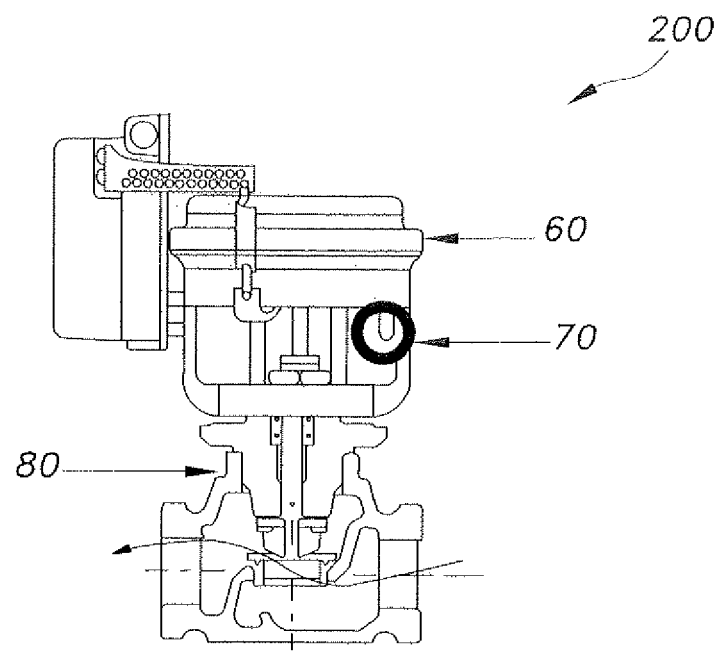
FIG. 2A is a front view of a valve controlled by a computer vision-based valve control system according to the present invention.
Figure 2B:
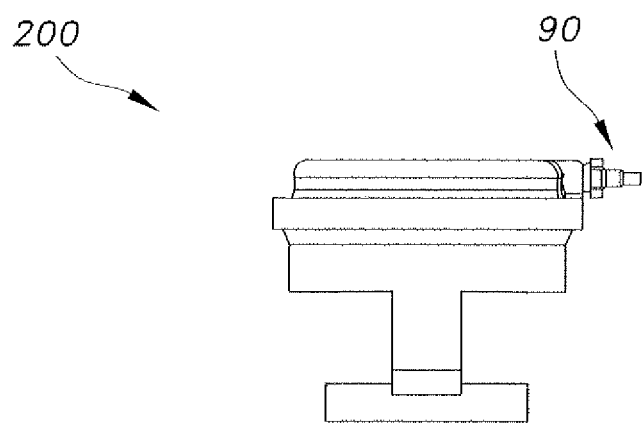
FIG. 2B is a side view of the valve of FIG. 2A, showing a valve actuator inlet.

As shown in FIGS. 2A-2B, the exemplary control valve 200 is a normally closed pneumatic valve from Johnson Controls. The valve body 80 is connected to the diaphragm-type valve actuator 60, which has a spring for stem return. The small metallic part 70 is used as the reference point or aiming point for the camera 10, since it is directly connected to the stem and moves with it linearly. The inlet 90 of the diaphragm-type valve actuator 60 has a 6 mm diameter.

Figure 3:
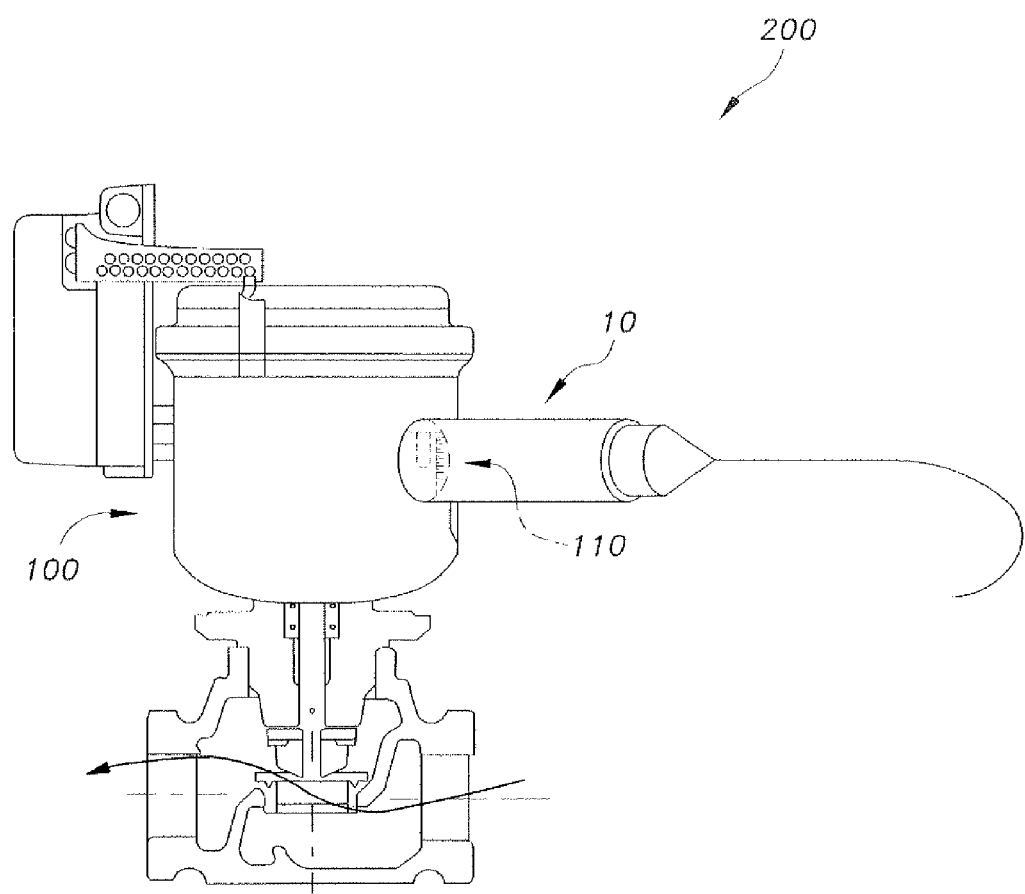
FIG. 3 is a front view of the valve of FIG. 2A, showing the camera of FIGS. 1A and 1B mounted on the valve.

As shown in FIG. 3, the camera 10 is mounted on the valve 200 at the optimal position. The valve is covered by the plastic cap 100 to isolate the stem from ambient light while being constantly illuminated by LEDs 20. The camera 10 is mounted so that there is no direct contact with any moving parts of the valve 200.

As shown in FIG. 4, the system includes an air compressor 120 that provides air pressure for control of the valve 200. The input of a water pump 150 is taken from the bottom of a tank 160. The input of the valve 200 is connected to the output of the water pump 150. The output of the valve 200 feeds the top of the water tank 160 for regulated re-entry of water into the tank 160. A flow meter 130 (from Omega Engineering) is in line with the output of the valve 200 and meters water flow while sending the flow measurement to the image processor 170. The camera 10 mounted on the valve 200 provides video that captures valve stem positioning and sends the video frames to the processor 170. The processor 170 utilizes the flow information, processes the video frames, and utilizes the resultant information in a PID formulation of control signals, which are sent to the I/P converter 140, which regulates the compressor 120 for control of the stem position of the valve 200. The system includes National Instrument LabView™ software, which provides control signals issued from the processor 170.

Figure 5:
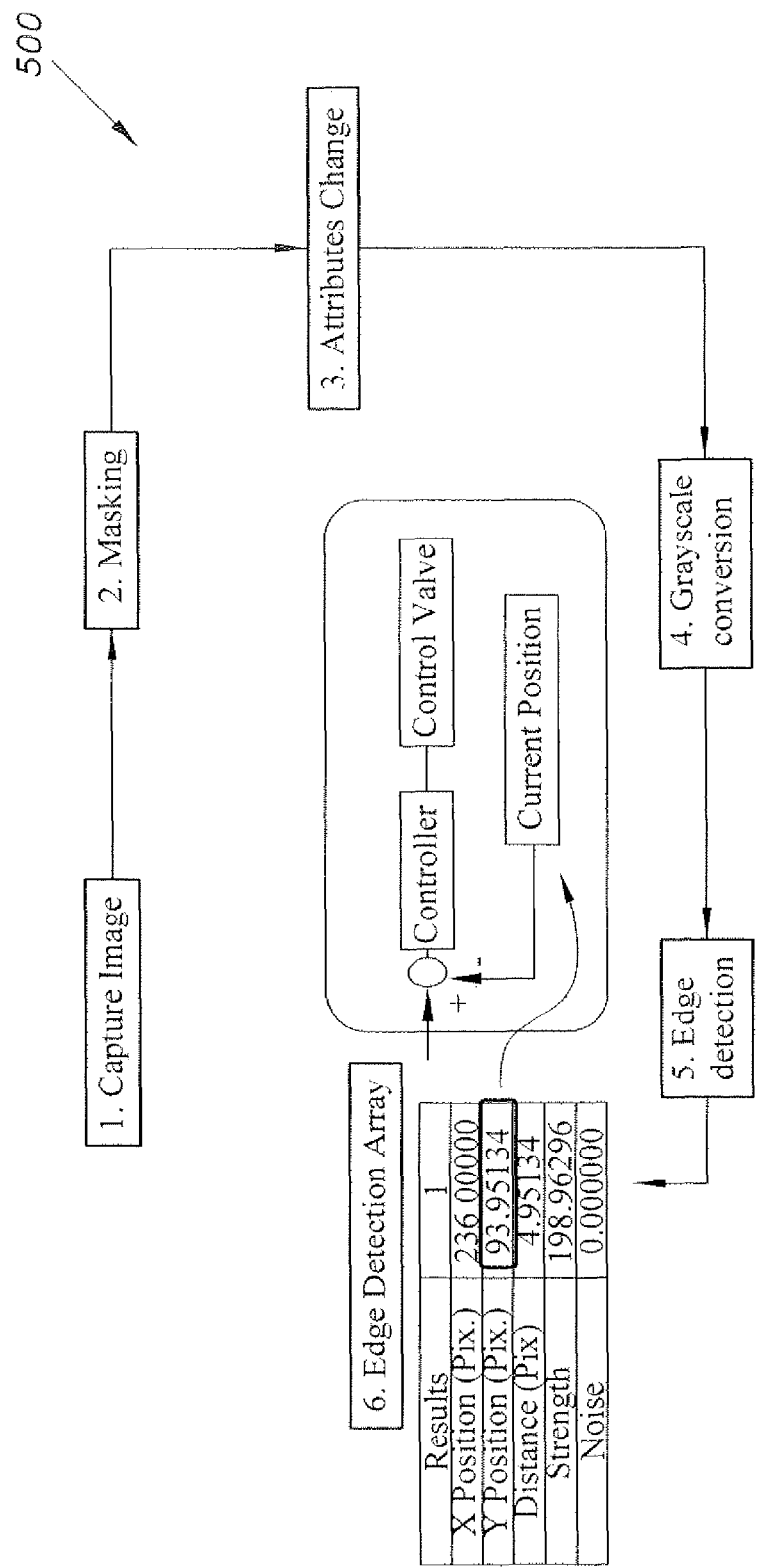
FIG. 5 is a flowchart of showing steps in processing camera images in a computer vision-based valve control system according to the present invention.

As shown in FIG. 5, the process flow 500 begins with each image frame being processed first by capturing the image frame. Next the image frame is masked. Subsequently the region of interest is selected. Some image attributes are changed to sharpen the region of interest details. Next, a grayscale conversion is performed, and the luminance plane is extracted. From the extracted luminance plane, the edge is detected, and finally the Y-position is extracted from the edge details. This value is converted to a percentage value and sent as current position feedback for the controller. While edge detection is an exemplary method discussed herein, it should be understood that other techniques can be used to detect the position of the stem, such as pattern recognition and comparison, color detection, and the like.

The image processing algorithm and a user interface are provided. The exemplary system uses NI LabView and NI Vision Assistant. The user interface has two modes of operations, including monitor mode, which allows the user to monitor the current position of the stem, and control mode, in which the position captured by the image is used as feedback. In control mode, the actual stem position is compared to the desired position, and accordingly, the input signal to the I/P converter 140 is adjusted utilizing the PID controller portion of the image processor 170.

The image processor 170 is designed to detect the edge as the stem moves up and down. Edge detection image processing is applied, starting from the offline calibration using NI Vision Assistant. The goal is to detect the edge of the moving part 70 as the stein moves. The edge is detected, and the vertical position is extracted from the image. The measurement is done using the scale of pixels, which provides a very accurate position measurement. The steps of image processing are shown in FIG. 5. The difference between maximum and minimum stein position is 164 pixels, and the stem movement is linear with pressure. Fitting a linear equation for pixels input and opening percentage output is given by:

$$\text{Percentage opening} = 0.6107 * \text{Pixel position} - 57.3795 \quad (1)$$

FIGS. 6A through 6D show plots 600a through 600d, which show the edge strength profile at four different stem positions. The Figures show that using this algorithm, the strength of the edge is maximized and the noise is minimized. The exemplary system has an image acquisition rate of 25 fps. Tests show that the performance of the system provides accurate position measurement. The accuracy achieved is ±0.3%. This accuracy can be increased using a higher resolution camera with auto focus. An absolute displacement accuracy of 0.5 mm is reached.

Since the computer vision-based valve control system uses a digital camera 10, which is based on solid state electronics, this removes the possibility of wear caused by friction of moving parts or electromagnetic interference with other devices. The vision-based method provides a lower cost and lower maintenance cost compared with mechanical methods. Moreover, there is no need for special design of the valve to implement the visual feedback device, since the method can be integrated with most available positioners in the market. It needs only to minimize the sharp fluctuation in light intensity in the environment around the valve.

This can be done by utilizing the exemplary shield or plastic cap 100. The effect of ambient light on image processing can be eliminated using a light sensor and an adaptive image processing algorithm that changes the processing parameters as the environmental light intensity changes. The camera 10 can be used to monitor the actual valve image, which is very useful, especially in case of a valve break.

Unless specifically stated otherwise as apparent from the above discussion, it is appreciated that throughout the description, discussions utilizing terms such as "processing" or "computing" or "calculating" or "determining" or "displaying" or "providing" or other present participle descriptive, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The system includes apparatus, e.g., image processor, process controller, and the like, for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of non-transitory media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems along with equivalent variations will be apparent to skilled artisans. In addition, the system is not described with reference to any particular programming language. It is appreciated that a variety of programming languages may be used to implement the teachings described herein, and any references to specific languages are provided for disclosure of enablement and best mode.

The system is well suited to a wide variety of computer network systems over numerous topologies. Within this field, the configuration and management of large networks comprise storage devices and computers that are communicatively coupled to similar and/or dissimilar computers and storage devices over a network, such as the Internet.

It is to be understood that the present invention is not limited to the embodiments described above, but encompasses any and all embodiments within the scope of the following claims.

We claim:

1. A computer implemented computer vision-based valve control method, comprising the steps of:
   transmitting video frames from a camera positioned to make observations of a valve stem position;
   receiving the video frames for image processing of the camera observations;
   image processing the video frames to determine percentage opening of the valve based on the valve stem position;
   outputting the percentage opening to a process controller input; and
   sending a process controller signal control opening and closing the valve based on the percentage opening of the valve determined in the image processing step.

2. The computer implemented valve control method according to claim 1, further comprising the step of illuminating a region of interest including said valve stem, thereby facilitating details of said valve stem position observations transmitted via said video frames.

3. The computer implemented valve control method according to claim 1, wherein said image processing step further comprises the step of detecting positioning and motion of an edge of a reference body on said valve stem, the positioning and motion of the reference body edge being linearly related to percentage opening of the valve according to the relation:

$$\text{Percentage opening} = C1 * \text{Pixel position} - C2,$$

where Pixel position represents edge positioning relative to a field of view of said camera, and C1 and C2 are constants determined by calibration of said camera.

4. The computer implemented valve control method according to claim 3, wherein said calibration comprises the step of automatically calibrating said camera.

5. The computer implemented valve control method according to claim 3, further comprising the step of adaptively processing images of said valve stem in the field of view of said camera according to light intensity proximate said valve actuator stem.

6. A computer software product, comprising a non-transitory storage medium readable by a computer processor, the non-transitory storage medium having stored thereon a set of instructions for computer vision-based valve control in a process control system, the set of instructions including:

(a) a first sequence of instructions which, when executed by the processor, causes said processor to initiate transmission of video frames from a camera positioned to make observations of a valve stem position;

(b) a second sequence of instructions which, when executed by the processor, causes said processor to receive said video frames for image processing of said camera observations;

(c) a third sequence of instructions which, when executed by the processor, causes said processor to perform image processing on said video frames to determine % open information of said valve based on said valve stem position;

(d) a fourth sequence of instructions which, when executed by the processor, causes said processor to output said % open information to a process controller input; and wherein said process controller utilizes said % open information to output control signals to said valve.

7. The computer software product according to claim 6, further comprising a fifth sequence of instructions which, when executed by the processor, causes said processor to activate a source of illumination trained on said valve stem thereby illuminating a region of interest including said valve stem to facilitate details of said valve stem position observations transmitted via said video frames.

8. The computer software product according to claim 6, further comprising a sixth sequence of instructions which, when executed by the processor, causes said processor to detect positioning and motion of an edge of a reference body on said valve stem, said positioning and motion of said reference body edge being linearly related to said valve open percent according to the relation:

$$\text{Percentage opening} = C1 * \text{Pixel position} - C2,$$

where Pixel position represents edge positioning relative to a field of view of said camera, and C1 and C2 are constants determined by calibration of said process control system.

9. The computer software product according to claim 8, further comprising a seventh sequence of instructions which, when executed by the processor, causes said processor to automatically calibrate said camera to derive said open percent relation including substitution of real valued numbers for said C1 and C2 constants.

10. The computer software product according to claim 8, further comprising an eighth sequence of instructions which, when executed by the processor, causes said processor to adaptively process images of said valve stem in said field of view of said camera according to light intensity proximate said valve actuator stem.

* * * * *